(12) United States Patent  (10) Patent No.: US 7,444,850 B2
Bauersachs et al.  (45) Date of Patent: Nov. 4, 2008

(54) METHOD AND DEVICE FOR SHAPING WORKPIECES

(75) Inventors: Lothar Bauersachs, Weidhausen (DE); Harald Barnickel, Niederfüllbach (DE)

(73) Assignee: Langenstein & Schemann GmbH, Coburg (DE)

( * ) Notice: Subject to any disclaimer, the term of this patent is extended or adjusted under 35 U.S.C. 154(b) by 0 days.

(21) Appl. No.: 10/564,773

(22) PCT Filed: May 28, 2004

(86) PCT No.: PCT/EP2004/005781

§ 371 (c)(1),
(2), (4) Date: Jan. 13, 2006

(87) PCT Pub. No.: WO2005/037460

PCT Pub. Date: Apr. 28, 2005

(65) Prior Publication Data

US 2006/0174677 A1    Aug. 10, 2006

(30) Foreign Application Priority Data

Sep. 19, 2003  (DE) .................................. 103 43 891

(51) Int. Cl.
*B21D 43/00* (2006.01)

(52) U.S. Cl. .............................. 72/361; 72/420; 72/422; 72/20.1; 72/20.3

(58) Field of Classification Search .................. 72/15.1, 72/15.2, 361, 420, 20.5, 20.4, 20.3; 700/213
See application file for complete search history.

(56) References Cited

U.S. PATENT DOCUMENTS

| 3,824,833 A | | 7/1974 | Bachmann | |
| 5,392,630 A | * | 2/1995 | Marinoni et al. | ............... 72/420 |
| 6,415,191 B1 | * | 7/2002 | Pryor | ........................... 700/95 |
| 6,812,593 B1 | * | 11/2004 | Fisher et al. | ................. 307/116 |
| 2006/0042339 A1 | * | 3/2006 | Denkmeier | .................. 72/15.1 |

FOREIGN PATENT DOCUMENTS

| DE | 10133624 A1 | 1/2002 |
| EP | 0671246 A3 | 9/1995 |

* cited by examiner

*Primary Examiner*—Derris H. Banks
*Assistant Examiner*—Debra M Wolfe
(74) *Attorney, Agent, or Firm*—Workman Nydegger

(57) ABSTRACT

The invention relates to a method for operating a shaping machine (1) having a tool (2), in particular a shaping machine having a shaping tool, in which the workpiece is handled by means of a handling device (3) during the manufacturing process. To improve the production process, the invention provides that before machining of workpieces on the shaping machine (1), the position and/or orientation of the tool (2) is/are determined by approaching at least one reference surface (5, 6, 7, 8, 9, 10) on the tool (2) with a handling device (3) equipped with at least one sensor (4, 4'), transmitting the determined positions of the reference surfaces (5, 6, 7, 8, 9, 10) to an evaluating means (11), and determining in the evaluating means (11) the position and orientation of the tool (2). The invention further relates to a shaping machine.

25 Claims, 1 Drawing Sheet

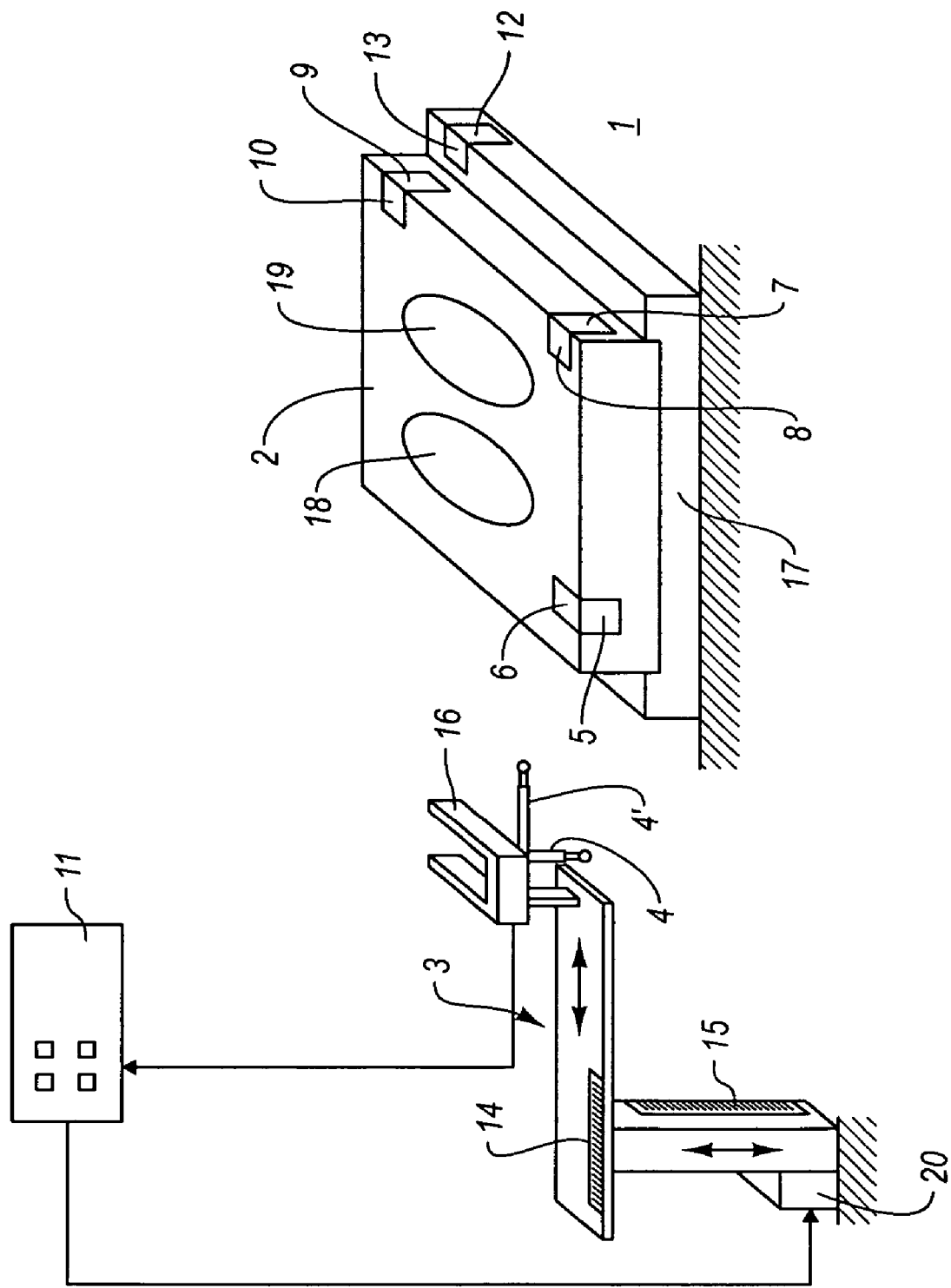

METHOD AND DEVICE FOR SHAPING WORKPIECES

BACKGROUND OF THE INVENTION

1. Field of the Invention

The invention relates to a method and a device for shaping workpieces.

2. Background and Related Art

To manufacture components by cold or warm shaping, for example by forging, shaping machines are used in which shaping tools are placed, in particular percussive shaping machines such as hammers, crank presses, and screw presses, and in particular flywheel screw presses. The shaping process is performed on an un-machined workpiece inserted into the tool by pressing or striking the tools together, thereby bringing the workpiece into its desired final shape.

The manufacturing process is automated by the use of handling devices, in particular manipulators and industrial robots, for handling the workpieces. These handling devices take the un-machined workpiece, in a first step usually from a hopper, and position the workpiece between the parts of the tool, usually having a two-piece design, which is placed in the shaping machine. After the handling device is removed from the working region of the shaping machine, the shaping process is carried out by moving the tool halves together. After the tool is opened, the handling device grips the finished workpiece and deposits it in a finished parts hopper.

The process reliability of the shaping process is principally a function of the precision with which the un-machined workpiece to be machined is inserted into the shaping machine, specifically, into the working region, and deposited there. In order to meet these demanding requirements, in the setup of the shaping machine it is necessary to adjust the handling device precisely to the position of the working region of the tool. This is rather laborious and time-consuming, and the setup process is consequently expensive.

After the tool is installed in the shaping machine following a tool replacement, heretofore it has been necessary to orient the handling device to the exact position of the tool. This prolongs the setup time and lowers productivity.

Furthermore, over the course of time the tool may loosen during the shaping process, which is particularly the case for percussive forging die shaping machines. This changes the position and orientation of the tool, making it necessary at certain intervals to realign the handling device relative to the instantaneous position of the tool in order to maintain sufficient process reliability. Heretofore, this adjustment has been performed by checking the points approached by the handling device and making appropriate corrections when deviations are encountered. This also prolongs the setup time and results in corresponding forfeiture of productivity of the unit.

If according to the prior art a periodic checking of the position of the tool and adjustment of the handling device is omitted, it is possible to keep the setup time low and/or achieve high productivity. However, this is achieved at the expense of process reliability or tool wear, since the positioning of the un-machined workpiece by the handling device cannot be ensured with sufficient accuracy. There is the general risk that the un-machined workpiece is inserted too imprecisely into the tool, resulting in the referenced problems.

Another problem which occurs in practice is the so-called "slippage" of the shaping tool, which is understood to mean that after a certain number of lifting operations by the shaping machine, the tool gravures become worn and the tool must be remachined. In this regard, the height of the workpiece is milled down; i.e., a new gravure is thus introduced into the tool. When this tool, the height of which has been changed, is now installed in the shaping machine, a complete realignment or adjustment of the handling device is necessary to avoid the above-referenced problems. This is also at the expense of productivity and/or process reliability of the unit.

BRIEF SUMMARY OF THE INVENTION

The object of the invention, therefore, is to propose a method and a device for shaping workpieces by which the referenced disadvantages may be at least partially overcome. It is also an object to enable rapid setup of the machine, in particular after tool replacement or tool remachining, while at the same time ensuring a high degree of process reliability.

This object is achieved according to the features of implementations of the invention.

The method according to one implementation of the present invention is intended for shaping, in particular forging, of workpieces by means of a shaping machine having at least one shaping tool, and comprises the following process steps:

a) Handling a workpiece during a machining process, in particular before, during, and/or after shaping of the workpiece by the shaping tools, by means of at least one handling device, in particular a manipulator or industrial robot, b) Determining the position and/or orientation of the workpiece, in particular before machining of workpieces on the shaping machine, using this tool, by b1) Approaching at least one predetermined reference surface on the tool with a detection device (or moving the detection device toward the reference surface) and detecting at least one position or one point on this/these reference surface(s) using the detection device, b2) Transferring information corresponding to the detected position(s) of the reference surface(s) to an evaluating means and b3) Determining the position and/or orientation of the tool from the information about the reference surface(s) corresponding to this/these position(s) by use of the evaluating means, and c) Using the position and/or orientation of the tool determined by the evaluating means as the basis for handling the tools by at least one handling device.

The device according to another or alternative implementation of the present invention is suitable for shaping, in particular forging, of workpieces and in particular for carrying out the method according to the invention, and specifies and comprises a) at least one shaping machine, in particular a forging machine, b) and at least one handling device for handling workpieces (to be shaped or reshaped), c) a detection device, d) at least one reference surface on a tool of the shaping machine for scanning or recognition, using at least one detection device, and e) an evaluating means which determines or is able to determine the position and/or orientation of the tool from the data or signals transmitted from the detection device.

Accordingly, before machining of the workpieces on the shaping machine using a tool, in particular after installation or replacement of a tool, the position and/or orientation of the tool is determined by approaching at least one reference surface on the tool with a manipulator or, in general, a handling device equipped with at least one sensor, transmitting the determined positions of the reference surfaces (in a predetermined coordinate system or reference system of the handling device) to an evaluating means (or computing means), and determining in the evaluating means the position and/or orientation of the tool. By use of the proposed procedure, the workpiece is handled with consideration for the exact tool position during the production of workpieces on the shaping machine, and in particular on the shaping machine for cold or warm shaping. The positioning in the machine of the workpieces to be machined and the conveying of same by the handling device after shaping thus take place in a precise and therefore reliable manner. Furthermore, it is possible to significantly reduce the setup time for the machine and to simplify the setup per se, resulting in a more cost-effective manufacturing process.

Advantageous embodiments and refinements of the method and the device according to the invention result from still further or alternative implementations or embodiments of the present invention.

In general, the detection device comprises at least one sensor and at least one handling device which supports and moves the sensor.

In one particularly advantageous embodiment, the handling device for the detection device for determining the position and/or orientation of the tool is used subsequently, or also beforehand, for handling the workpieces. Thus, the handling device(s) for handling the workpieces also simultaneously performs the calibration steps for determining the tool position.

The detection device or the handling device for the detection device is preferably equipped with (a) position measurement system(s) by which the position of at least one sensor in space or in the reference system of the handling device for the workpieces is determined.

The sensor(s) for the detection device may be contactless sensors, for example proximity switches or proximity sensors, or ultrasound sensors, or they may be contacting sensors such as short-circuiting switches or contact switches. The sensors are positioned in particular in the vicinity of a gripper for the handling device, which is generally provided for gripping a workpiece.

In general, the position of the coordinate system or reference system of each handling device for handling the workpieces is calculated from the detected position(s) of the reference surface(s) of the tool and/or the information provided by the evaluating means, in particular by use of translation imaging (linear displacement) and/or rotary imaging.

Preferably, the position(s) of the reference surfaces are used to detect at least three points in space, or, for the coordinate system or reference system, to detect at least one handling device for handling the workpieces.

It is possible to detect only one point or one position on one, or each, respective reference surface, or also, by scanning, to detect multiple points. In particular, the handling device together with the detection device approaches at least three reference surfaces on the tool, preferably in a predetermined sequence, and the detection device in each case precisely detects one position or one point on each of these reference surfaces.

In one particular embodiment, the position(s) of the reference surfaces, or, for the coordinate system or reference system, of at least one handling device for handling the workpieces, is/are used to determine only one reference plane in space. The reference plane in space, or, for the coordinate system or reference system, of at least one handling device for handling the workpieces, may be determined in particular from two positions of the reference surface(s) or two reference surfaces on the one hand, and from predetermined, additional linearly independent information, in particular information about a plane that is parallel to the reference plane.

In general, the detection device or the handling device for the detection device approaches the reference surfaces on the tool from predetermined starting points. The starting points are usually selected to be above and/or in the vicinity of the reference surfaces, so that an approximate adjustment has already been made, and the detection device only has to perform a fine adjustment. The starting points preferably are located in the same configuration relative to one another as for the reference surfaces on the tool.

After replacing a tool or after initial installation, or if the tool has become loose, it is preferable to first determine the position and/or orientation of the tool using at least one handling device equipped with a detection device and the evaluating means within the scope of a learning or calibration step, and then to handle the workpieces based on the determined position and/or orientation of the tool. Tool replacement and subsequent resetting of the machine may thus be performed much more quickly.

In one particular refinement, automatic checking may be provided in which, before the position and/or orientation of the tool is determined, at least one detection device is tested by the detection device approaching a test surface, preferably provided on a tool mounting, and issuing in particular an alarm signal when the test of the detection device determines an irregularity in the evaluating means.

The reference surfaces on the tool may be designed as flat surfaces, of which at least two are oriented substantially at right angles relative to one another to determine, for example, the height and width of a tool.

The accuracy of detection of the reference surface position(s) is typically 0.1 mm. The evaluating means is usually a digital computer having processor(s) and memory/memories and stored control and computation programs.

For percussive shaping machines such as forging hammers or screw presses, the method according to the invention is used to check at least the position of the lower tool or forging die.

BRIEF DESCRIPTION OF THE DRAWINGS

FIG. 1 illustrates an exemplary embodiment of the invention. The single figure shows a schematic view of a shaping machine having a tool and a handling device.

DETAILED DESCRIPTION OF THE PREFERRED EMBODIMENTS

FIG. 1 shows only in a very schematic fashion a shaping machine 1 having a mounting 17 which clamps a tool 2. It is indicated, also only in a very schematic fashion, that the tool 2 has gravures 18, 19 which during the shaping process deform a workpiece (not illustrated) in such a way that it assumes a desired shape.

A handling device 3 provided with a gripper 16 is used to insert the un-machined workpieces into the tool 2 of the shaping machine 1 and to convey the workpieces after the shaping process is completed. The workpiece is handled by the gripper 16. The handling device 3 has position measurement systems 14 and 15, which likewise are illustrated in the figure only in a very schematic fashion. The handling device 3 is connected to an evaluating means 11 which actuates a drive 20 for the axes of the handling device 3. In this manner, the gripper 16 can be moved by means of the handling device 3 into the positions necessary to position the workpiece.

It is particularly advantageous and useful to install the gravures of the tool 2 at the same position within a product series so that it is not necessary to correct the positions traversed by the handling device 3.

The following is provided to increase process reliability of the shaping process and reduce the setup time:

Two sensors 4 and 4' are situated in the vicinity of the gripper 16. In the exemplary embodiment, the sensors 4 and 4' are contacting measurement systems equipped with a short-circuit switch. By means of the position measurement systems 14, 15 for the handling device 3, the sensors 4, 4' may be used to determine an exact location of the gripper 16 in space. The design of the sensors 4, 4' with a short-circuit switch has the advantage that this sensor system is relatively insensitive to impurities and heat.

To speed up the setup process and to increase the process reliability, after the tool 2 is installed in the shaping machine 1 the gripper-side end of the handling device 3 and specifically the sensors 4, 4'—triggered by the evaluating means 11—approach a vertically oriented test surface 12 and a horizontally oriented test surface 13 located on the shaping machine 1. Since the bases for both the handling device 3 and the shaping machine 1 are stationarily positioned with respect to one another, approaching the test surfaces 12, 13 first of all enables the proper functioning of the handling device 3 and/or the sensors 4, 4' to be determined: after appropriate displacement motions of the axes of the handling device 3 are specified, there must be contact between the sensor 4, 4' and the test surface 12, 13 in order for the system to be in a proper state. This may be recorded by the evaluating means 11.

If in the event of an error situation the proper contact between sensor 4, 4' and test surface 12, 13 is not present, the evaluating means 11 is able to issue an alarm signal indicating an improper state of the system.

If proper functioning of the system has been determined, as is normally the case, the evaluating means 11 then triggers an actuation of the drive 20 of the handling device 3 in such a way that six different reference surfaces 5, 6, 7, 8, 9, 10 on the tool 2 are approached by the sensors 4 or 4'. To this end, the end region of the handling device 3 on which the sensors 4, 4' are mounted vertically or horizontally approaches the reference surfaces 5, 6, 7, 8, 9, 10 in one respective axial direction until contact is made between sensor and reference surface. The sensor 4, 4' responds upon contact, enabling the evaluating means 11 to detect the exact position of the reference surfaces, i.e., the spatial position thereof, based on the position measurement systems 14, 15.

As is common for scanning measurement devices, the end region of the handling device 3 together with the gripper 16 and sensors 4, 4' is initially traversed in a rapid motion of the drive 20 in the vicinity of the reference surfaces 5, 6, 7, 8, 9, 10. The particular reference surface is then approached at a reduced speed until contact is made between sensor 4, 4' and reference surface 5, 6, 7, 8, 9, 10.

After the position of the reference surfaces 5, 6, 7, 8, 9, 10 is determined, based on the determined spatial points on the tool 2 and with the knowledge of the site at which the reference surfaces are mounted on the tool 2, the evaluating means 11 can deduce the position and orientation of this site in a manner known as such; i.e., from the determined position of the reference surfaces 5, 6, 7, 8, 9, 10 in space the evaluating means 11 is able to compute a reference plane of the tool for the handling device, or the exact three-dimensional location or position of the tool 2. Based on this information, during handling by the handling device 3 of the workpieces to be finished the exact location and position of the tool 2 is taken into account for the motions of the handling device 3 in its coordinate system or reference system when workpieces are inserted into the tool 2 by the handling device 3 and are removed therefrom after the shaping is completed.

Thus, not only is it possible to quickly set up the shaping machine after replacement of a tool, but a high degree of process reliability can also be guaranteed, since the handling device 3 is able to insert the workpiece into the tool 2 in the optimum position.

The exemplary embodiment shows how the handling device 3, provided for handling of workpieces, simultaneously measures the reference surfaces 5, 6, 7, 8, 9, 10. Alternatively, however, a separate handling device may also be used for determining the location and position of the tool 2 based on the reference surfaces.

LIST OF REFERENCE NUMBERS

1 Shaping machine
2 Tool
3 Handling device
4 Sensor
4' Sensor
5 Reference surface
6 Reference surface
7 Reference surface
8 Reference surface
9 Reference surface
10 Reference surface
11 Evaluating means
12 Test surface
13 Test surface
14 Position measurement system
15 Position measurement system
16 Gripper
17 Mounting
18 Gravure
19 Gravure
20 Drive

The invention claimed is:

1. A method for forging workpieces using a forging machine having at least one shaping tool, comprising:
   a) handling one or more workpieces during a machining process with at least one handling device;
   b) prior to machining the workpiece on a forging machine, determining a position and/or orientation of at least one shaping tool of the forging machine by:
      b1) approaching one or more predetermined reference surfaces on the at least one shaping tool with a detection device, thereby detecting at least one position of one or more of the one or more predetermined reference surfaces;
      b2) transmitting to an evaluating means information from the detection device corresponding to the detected at least one position of the one or more of the one or more predetermined reference surfaces; and
      b3) the evaluating means determining the position and/or orientation of the at least one shaping tool from the transmitted information regarding the detected at least one position of the one or more of the one or more predetermined reference surfaces; and
   c) using the determined position and/or orientation of the at least one shaping tool as a basis for handling the one or more workpieces by the at least one handling device;
   wherein the detection device comprises the at least one handling device equipped with at least one sensor.

2. The method as recited in claim 1, wherein the at least one handling device of the detection device is also used as a handling device for handling the one or more workpieces.

3. The method as recited in claim 1, further comprising the evaluating means calculating a position of a coordinate system or reference system of each at least one handling device from the detected at least one position by use of translation imaging and/or rotary imaging.

4. The method as recited in claim 3, further comprising, using the detected at least one position, performing at least one of:
(i) detecting at least three points in space; or
(ii) for the coordinate system or reference system, detecting at least three points of the at least one handling device for handling the one or more workpieces.

5. The method as recited in claim 1, wherein the detection device detects at least two positions or points of the one or more predetermined reference surfaces by scanning the one or more predetermined reference surfaces.

6. The method as recited in claim 1, wherein the detection device approaches at least three reference surfaces on the at least one shaping tool, preferably in a predetermined sequence, and in each case precisely detects one position or one point on each of the one or more predetermined reference surfaces.

7. The method as recited in claim 1, further comprising, using a plurality of detected positions of the one or more predetermined reference surfaces, performing at least one of:
(i) determining a reference plane in space; or
(ii) for a coordinate system or reference system, determining a reference plane of at least one handling device for handling the workpiece.

8. The method as recited in claim 7, wherein the reference plane in space, or, for the coordinate system or reference system, the reference plane of at least one handling device for handling the workpieces, is determined from:
(i) two positions of the one or more predetermined surfaces; and
(ii) predetermined, additional linearly-independent information about a plane that is parallel to the reference plane.

9. The method as recited in claim 1, wherein the detection device or the at least one handling device for the detection device approaches the one or more predetermined reference surfaces on the at least one shaping tool from one or more predetermined starting points.

10. The method as recited in claim 9, wherein a plurality of the predetermined starting points are located in the same configuration relative to one another as for a plurality of the predetermined reference surfaces on the at least one shaping tool.

11. The method as recited in claim 1, further comprising:
after replacing the at least one shaping tool with a new shaping tool, determining a position and/or orientation of the new shaping tool using the detection device and the evaluating means in a learning or calibration step; and
basing the handling of the one or more workpieces on the determined position and/or orientation of the new shaping tool.

12. The method as recited in claim 11, further comprising, prior to determining the position and/or orientation of the new shaping tool, testing at least one detection device or one or more sensors thereof by approaching, with the detection device, a test surface on a tool mounting of the new shaping tool.

13. The method as recited in claim 12, further comprising:
identifying an irregularity in the evaluating means when testing the at least one detection device; and
issuing an alarm signal.

14. A device configured for forging workpieces, comprising:
a) at least one forging machine;
b) at least one handling device for handling one or more workpieces;
c) at least one detection device;
d) one or more predetermined reference surfaces on a shaping tool of the forging machine, wherein the at least one of the one or more predetermined reference surfaces is positioned to be scanned or recognized by the at least one detection device; and
e) an evaluating means configured to determine a position and/or orientation of the shaping tool from information transmitted by the detection device;
wherein the at least one detection device further comprises the at least one handling device being equipped with at least one sensor, wherein the at least one sensor is any one or more of a contacting sensor, a non-contacting sensor, a proximity switch or sensor, an ultrasound sensor, a short-circuiting switch, or a contact switch.

15. A method for shaping or forging workpieces using a shaping machine having at least one shaping tool, comprising:
a) handling one or more workpieces during a machining process with at least one handling device;
b) prior to machining the workpiece on a shaping machine, determining a position and/or orientation of at least one shaping tool of the shaping machine by:
b1) approaching one or more predetermined reference surfaces on the at least one shaping tool with a detection device, thereby detecting at least one position of one or more of the one or more predetermined reference surfaces;
b2) transmitting to an evaluating means information from the detection device corresponding to the detected at least one position of the one or more of the one or more predetermined reference surfaces; and
b3) the evaluating means determining the position and/or orientation of the at least one shaping tool from the transmitted information regarding the detected at least one position of the one or more of the one or more predetermined reference surfaces;
b4) the evaluating means calculating a position of a coordinate system or reference system of each at least one handling device from the detected at least one position by use of translation imaging and/or rotary imaging; and
c) using the determined position and/or orientation of the at least one shaping tool as a basis for handling the one or more workpieces by the at least one handling device.

16. A method for shaping or forging workpieces using a shaping machine having at least one shaping tool, comprising:
a) handling one or more workpieces during a machining process with at least one handling device;
b) prior to machining the workpiece on a shaping machine, determining a position and/or orientation of at least one shaping tool of the shaping machine by:
b1) approaching one or more predetermined reference surfaces on the at least one shaping tool with a detection device, thereby detecting at least one position of one or more of the one or more predetermined reference surfaces;

b2) transmitting to an evaluating means information from the detection device corresponding to the detected at least one position of the one or more of the one or more predetermined reference surfaces; and b3) the evaluating means determining the position and/or orientation of the at least one shaping tool from the transmitted information regarding the detected at least one position of the one or more of the one or more predetermined reference surfaces;

b4) the evaluating means calculating a position of a coordinate system or reference system of each at least one handling device from the detected at least one position by use of translation imaging and/or rotary imaging;

c) using the determined position and/or orientation of the at least one shaping tool as a basis for handling the one or more workpieces by the at least one handling device; and d) using the detected at least one position, performing at least one of:
(d1) detecting at least three points in space; or
(d2) for the coordinate system or reference system, detecting at least three points of the at least one handling device for handling the one or more workpieces.

17. A method for shaping or forging workpieces using a shaping machine having at least one shaping tool, comprising:

a) handling one or more workpieces during a machining process with at least one handling device;

b) prior to machining the workpiece on a shaping machine, determining a position and/or orientation of at least one shaping tool of the shaping machine by:

b1) approaching one or more predetermined reference surfaces on the at least one shaping tool with a detection device, thereby detecting at least one position of one or more of the one or more predetermined reference surfaces;

b2) transmitting to an evaluating means information from the detection device corresponding to the detected at least one position of the one or more of the one or more predetermined reference surfaces; and b3) the evaluating means determining the position and/or orientation of the at least one shaping tool from the transmitted information regarding the detected at least one position of the one or more of the one or more predetermined reference surfaces;

c) using the determined position and/or orientation of the at least one shaping tool as a basis for handling the one or more workpieces by the at least one handling device;

wherein:
the detection device comprises the at least one handling device equipped with at least one sensor; and
the at least one handling device of the detection device is also used as a handling device for handling the one or more workpieces.

18. A method for shaping or forging workpieces using a shaping machine having at least one shaping tool, comprising:

a) handling one or more workpieces during a machining process with at least one handling device;

b) prior to machining the workpiece on a shaping machine, determining a position and/or orientation of at least one shaping tool of the shaping machine by:

b1) approaching one or more predetermined reference surfaces on the at least one shaping tool with a detection device, thereby detecting at least one position of one or more of the one or more predetermined reference surfaces;

b2) transmitting to an evaluating means information from the detection device corresponding to the detected at least one position of the one or more of the one or more predetermined reference surfaces; and b3) the evaluating means determining the position and/or orientation of the at least one shaping tool from the transmitted information regarding the detected at least one position of the one or more of the one or more predetermined reference surfaces;

c) using the determined position and/or orientation of the at least one shaping tool as a basis for handling the one or more workpieces by the at least one handling device; and d) using a plurality of detected positions of the one or more predetermined reference surfaces, performing at least one of:
(d1) determining a reference plane in space; or
(d2) for a coordinate system or reference system, determining a reference plane of at least one handling device for handling the workpiece;
wherein the reference plane in space, or, for the coordinate system or reference system, the reference plane of at least one handling device for handling the workpieces, is determined from:
two positions of the one or more predetermined surfaces; and
predetermined, additional linearly-independent information about a plane that is parallel to the reference plane.

19. A method for shaping or forging workpieces using a shaping machine having at least one shaping tool, comprising:

a) handling one or more workpieces during a machining process with at least one handling device;

b) prior to machining the workpiece on a shaping machine, determining a position and/or orientation of at least one shaping tool of the shaping machine by:

b1) approaching one or more predetermined reference surfaces on the at least one shaping tool with a detection device, thereby detecting at least one position of one or more of the one or more predetermined reference surfaces;

b2) transmitting to an evaluating means information from the detection device corresponding to the detected at least one position of the one or more of the one or more predetermined reference surfaces; and b3) the evaluating means determining the position and/or orientation of the at least one shaping tool from the transmitted information regarding the detected at least one position of the one or more of the one or more predetermined reference surfaces; and c) using the determined position and/or orientation of the at least one shaping tool as a basis for handling the one or more workpieces by the at least one handling device;

wherein the detection device approaches at least three reference surfaces on the at least one shaping tool in a predetermined sequence, and in each case precisely detects one position or one point on each of the one or more predetermined reference surfaces.

20. A method for shaping or forging workpieces using a shaping machine having at least one shaping tool, comprising:

a) handling one or more workpieces during a machining process with at least one handling device;

b) prior to machining the workpiece on a shaping machine, determining a position and/or orientation of at least one shaping tool of the shaping machine by:

b1) approaching one or more predetermined reference surfaces on the at least one shaping tool with a detection device, thereby detecting at least one position of one or more of the one or more predetermined reference surfaces;

b2) transmitting to an evaluating means information from the detection device corresponding to the detected at least one position of the one or more of the one or more predetermined reference surfaces; and b3) the evaluating means determining the position and/or orientation of the at least one shaping tool from the transmitted information regarding the detected at least one position of the one or more of the one or more predetermined reference surfaces; and c) using the determined position and/or orientation of the at least one shaping tool as a basis for handling the one or more workpieces by the at least one handling device;

wherein the detection device or the at least one handling device for the detection device approaches a plurality of the predetermined reference surfaces on the at least one shaping tool from a plurality of predetermined starting points;

wherein the plurality of predetermined starting points are located in the same configuration relative to one another as for the plurality of predetermined reference surfaces on the at least one shaping tool.

21. A method for shaping or forging workpieces using a shaping machine having at least one shaping tool, comprising:

a) handling one or more workpieces during a machining process with at least one handling device;

b) prior to machining the workpiece on a shaping machine, determining a position and/or orientation of at least one shaping tool of the shaping machine by:

b1) approaching one or more predetermined reference surfaces on the at least one shaping tool with a detection device, thereby detecting at least one position of one or more of the one or more predetermined reference surfaces;

b2) transmitting to an evaluating means information from the detection device corresponding to the detected at least one position of the one or more of the one or more predetermined reference surfaces; and b3) the evaluating means determining the position and/or orientation of the at least one shaping tool from the transmitted information regarding the detected at least one position of the one or more of the one or more predetermined reference surfaces;

c) using the determined position and/or orientation of the at least one shaping tool as a basis for handling the one or more workpieces by the at least one handling device; and d) after replacing the at least one shaping tool with a new shaping tool, performing the further steps of:

d1) testing at least one detection device or one or more sensors thereof by approaching, with the detection device, a test surface on a tool mounting of the new shaping tool;

d2) determining a position and/or orientation of the new shaping tool using the detection device and the evaluating means in a learning or calibration step; and d3) basing the handling of the one or more workpieces on the determined position and/or orientation of the new shaping tool.

22. A method for shaping or forging workpieces using a shaping machine having at least one shaping tool, comprising:

a) handling one or more workpieces during a machining process with at least one handling device;

b) prior to machining the workpiece on a shaping machine, determining a position and/or orientation of at least one shaping tool of the shaping machine by:

b1) approaching one or more predetermined reference surfaces on the at least one shaping tool with a detection device, thereby detecting at least one position of one or more of the one or more predetermined reference surfaces;

b2) transmitting to an evaluating means information from the detection device corresponding to the detected at least one position of the one or more of the one or more predetermined reference surfaces; and b3) the evaluating means determining the position and/or orientation of the at least one shaping tool from the transmitted information regarding the detected at least one position of the one or more of the one or more predetermined reference surfaces;

c) using the determined position and/or orientation of the at least one shaping tool as a basis for handling the one or more workpieces by the at least one handling device; and d) after replacing the at least one shaping tool with a new shaping tool, performing the further steps of:

d1) testing at least one detection device or one or more sensors thereof by approaching, with the detection device, a test surface on a tool mounting of the new shaping tool;

d2) determining a position and/or orientation of the new shaping tool using the detection device and the evaluating means in a learning or calibration step;

d3) basing the handling of the one or more workpieces on the determined position and/or orientation of the new shaping tool wherein the step (d1) for testing further comprises:

identifying an irregularity in the evaluating means when testing the at least one detection device; and issuing an alarm signal.

23. A device configured for forging workpieces, comprising:

a) at least one forging machine;

b) at least one handling device for handling one or more workpieces;

c) at least one detection device;

d) one or more predetermined reference surfaces on a shaping tool of the forging machine, wherein the at least one of the one or more predetermined reference surfaces is positioned to be scanned or recognized by the at least one detection device; and e) an evaluating means configured to determine a position and/or orientation of the shaping tool from information transmitted by the detection device;

wherein the at least one detection device further comprises the at least one handling device being equipped with at least one sensor, the at least one sensor is any one or more of a contacting sensor, a non-contacting sensor, a proximity switch or sensor, an ultrasound sensor, a short-circuiting switch, or a contact switch; and wherein the at least one the handling device for the detection device further comprises a position measurement system for determining the position of the at least one sensor in space.

24. A device configured for forging workpieces, comprising:

a) at least one forging machine;

b) at least one handling device for handling one or more workpieces;

c) at least one detection device;

d) one or more predetermined reference surfaces on a shaping tool of the forging machine, wherein the at least one of the one or more predetermined reference surfaces is positioned to be scanned or recognized by the at least one detection device; and e) an evaluating means configured to determine a position and/or orientation of the shaping tool from information transmitted by the detection device;

wherein the at least one detection device further comprises the at least one handling device being equipped with at least one sensor, wherein the at least one sensor is any one or more of a contacting sensor, a non-contacting sensor, a proximity switch or sensor, an ultrasound sensor, a short-circuiting switch, or a contact switch; and wherein the at least one handling device further comprises a gripper for gripping the one or more workpieces, and at least one sensor located in the vicinity of the gripper.

25. A device configured for forging workpieces, comprising:

a) at least one forging machine;

b) at least one handling device for handling one or more workpieces;

c) at least one detection device;

d) one or more predetermined reference surfaces on a shaping tool of the forging machine, wherein the at least one of the one or more predetermined reference surfaces is positioned to be scanned or recognized by the at least one detection device; and e) an evaluating means configured to determine a position and/or orientation of the shaping tool from information transmitted by the detection device;

wherein the at least one detection device further comprises the at least one handling device being equipped with at least one sensor, wherein the at least one sensor is any one or more of a contacting sensor, a non-contacting sensor, a proximity switch or sensor, an ultrasound sensor, a short-circuiting switch, or a contact switch; and wherein:

(i) the one or more predetermined reference surfaces on the at least one shaping tool are designed as flat surfaces; and (ii) at least two of the one or more predetermined reference surfaces are oriented substantially at right angles relative to one or more of:

1. one another; or 2. at least one test surface with which a function of the at least one handling device and/or at least one sensor can be tested.

* * * * *

UNITED STATES PATENT AND TRADEMARK OFFICE
CERTIFICATE OF CORRECTION

PATENT NO.       : 7,444,850 B2
APPLICATION NO.  : 10/564773
DATED            : November 4, 2008
INVENTOR(S)      : Bauersachs et al.

It is certified that error appears in the above-identified patent and that said Letters Patent is hereby corrected as shown below:

Column 2
Line 13, "an object" to --an object of the present invention to--
Line 16, "features of" to --features and--

Column 5
Line 56, "reference surface" to --reference surfaces--

Column 6
Line 1, "finished" to --finished,--
Line 7, "machine" to --machine 1--
Line 7, "of a tool" to --of the tool 2--

Column 11
Line 53, "tool:" to --tool;--

Column 12
Line 29, "tool" to --tool;--
Line 55, delete "the" after "handling"

Signed and Sealed this

Seventeenth Day of November, 2009

David J. Kappos
*Director of the United States Patent and Trademark Office*